US007515824B2

(12) United States Patent
Ting

(10) Patent No.: US 7,515,824 B2
(45) Date of Patent: Apr. 7, 2009

(54) SHUTTER CONTROL APPARATUS AND THE METHOD THEREOF

(75) Inventor: Hou-Chun Ting, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 323 days.

(21) Appl. No.: 11/308,719

(22) Filed: Apr. 26, 2006

(65) Prior Publication Data

US 2007/0140680 A1 Jun. 21, 2007

Related U.S. Application Data

(60) Provisional application No. 60/751,154, filed on Dec. 16, 2005.

(30) Foreign Application Priority Data

Feb. 22, 2006 (TW) .............................. 95105879 A

(51) Int. Cl.
*G03B 17/00* (2006.01)
*G03B 3/00* (2006.01)
*G03B 17/38* (2006.01)

(52) U.S. Cl. ........................ 396/266; 396/104; 396/503

(58) Field of Classification Search ................. 396/235, 396/263–266, 104, 129, 302, 502–504
See application file for complete search history.

(56) References Cited

U.S. PATENT DOCUMENTS

| | | | | |
|---|---|---|---|---|
| 4,429,974 | A * | 2/1984 | Suzuki | 396/302 |
| 4,636,056 | A * | 1/1987 | Kobayashi et al. | 396/302 |
| 5,895,130 | A | 4/1999 | Saito et al. | 396/130 |
| 2003/0048362 | A1* | 3/2003 | Watanabe et al. | 348/222.1 |
| 2004/0160512 | A1* | 8/2004 | Lee et al. | 348/42 |

* cited by examiner

*Primary Examiner*—W. B. Perkey
*Assistant Examiner*—Minh Phan
(74) *Attorney, Agent, or Firm*—Jianq Chyun IP Office

(57) ABSTRACT

A shutter control apparatus and the method thereof are provided. The shutter control apparatus is suitable for controlling a shutter of a camera apparatus. The shutter control apparatus includes a resistor and a switch. The resistor is coupled between an output terminal and a ground voltage source. The switch is coupled between a voltage source and the output terminal. The switch has a first trigger and a second trigger. The shutter of the camera apparatus is turned on/off by the shutter control apparatus according to the timing between the first trigger and the second trigger of the switch. Thereby, the shutter control apparatus has less component and compactness.

39 Claims, 3 Drawing Sheets

SHUTTER CONTROL APPARATUS AND THE METHOD THEREOF

CROSS-REFERENCE TO RELATED APPLICATION

This application claims the priority benefits of U.S. provisional application titled "A SHUTTER DEVICE FOR PHOTOGRAPHING SYSTEM" filed on Dec. 16, 2005, Ser. No. 60/751,154. All disclosure of this application is incorporated herein by reference. This application also claims the priority benefit of Taiwan application serial no. 95105879, filed on Feb. 22, 2006.

BACKGROUND OF THE INVENTION

1. Field of Invention

The present invention relates to a shutter control apparatus of a camera apparatus. More particularly, the present invention relates to a shutter control apparatus, which turns on/off the shutter with a single switch, and the method thereof.

2. Description of Related Art

The design of mobile communication apparatuses or consumer electronic products (for example, digital camera) is usually towards lightness and smallness, and along with the increase of additional functions, the space in the device for circuit is getting smaller and smaller. Thus, how to accomplish the same functions with least circuit components or structure design within a limited space is the major subject of the development of mobile communication device.

Nowadays, the function of digital camera has become an important additional function on mobile apparatuses. However, the shutter of a general digital camera is usually controlled by 2-step switch. FIG. 1 is a diagram of a conventional shutter control circuit. As shown in FIG. 1, the switches $S_1$ and $S_2$ respectively control the output voltage levels of the output terminals OUT1 and OUT2. While the switch $S_1$ is turned on, the voltage level of the output terminal OUT1 is high voltage level, and here the digital camera focuses. While the switch $S_2$ is turned on, the voltage level of the output terminal OUT2 is high voltage level, and here the digital camera takes a picture.

However, since the circuit illustrated in FIG. 1 requires many components, a lot of space is needed if this circuit is adopted for the shutter control of a mobile communication device. If the shutter control with the same function can be achieved with fewer components or with the help of software, the space efficiency of mobile communication device can be increased and the manufacturing cost can be reduced.

SUMMARY OF THE INVENTION

Accordingly, the present invention is directed to provide a shutter control apparatus of a camera apparatus, which controls the auto focus and the on/off of the shutter of a camera apparatus according to the timing between two triggers of the switch (switching from on status to open circuit status and from open circuit status to on status), so as to simplify the circuit design and to reduce the component cost.

According to another aspect of the present invention, a shutter control apparatus of a camera apparatus is provided, which respectively controls the auto focus and the on/off of the shutter of the camera apparatus according to two statuses of the switch, so as to simplify the circuit design and to reduce the component cost.

According to yet another aspect of the present invention, a shutter control method for a camera apparatus is provided, which controls the auto focus and the on/off of the shutter of the camera apparatus according to the timing between two trigger statuses of the switch so as to simplify the circuit design and to reduce the component cost.

According to yet another aspect of the present invention, a camera apparatus is provided, wherein the auto focus and the on/off of the shutter of the camera apparatus are respectively controlled according to the timing of a single button being pressed, so as to simply the circuit design and to reduce the component cost.

According to yet another aspect of the present invention, a camera apparatus is provided, wherein the auto focus and the on/off of the shutter of the camera apparatus are respectively controlled according to two trigger statuses of the switch, so as to simplify the circuit design and to reduce the component cost.

To achieve the aforementioned and other objectives, the present invention provides a shutter control apparatus, which is suitable for controlling the shutter of a camera apparatus, and the shutter control apparatus includes an output terminal, a voltage source, a ground voltage source, a switch, and a resistor. The switch is coupled between the voltage source and the output terminal, and the resistor is coupled between the output terminal and the ground voltage source.

Wherein the switch has a first trigger status and a second trigger status. While the switch produces the first trigger status, the camera apparatus automatically focuses. Next, while the switch produces the second trigger status, if the timing between the adjacent first trigger status and second trigger status locates between an upper limit and a lower limit, the shutter control apparatus turns on/off the shutter of the camera apparatus so that the camera apparatus takes a picture. In an embodiment of the present invention, the foregoing first trigger status refers to the trigger status when the switch is switching from open circuit status to on status, and the foregoing second trigger status refers to the trigger status when the switch is switching from on status to open circuit status.

According to another aspect of the present invention, a shutter control method is provided, which is suitable for controlling the shutter of a camera apparatus. The camera apparatus has a switch which has a first trigger status and a second trigger status. The foregoing shutter control method includes the following steps. First, the first trigger status and the second trigger status are produced sequentially. When the first trigger status is produced, the camera apparatus automatically focuses. Then, when the second trigger status is produced, the timing between the first trigger status and the second trigger status is estimated. If the timing between the first trigger status and the second trigger status locates between an upper limit and a lower limit, the shutter of the camera apparatus is turned on/off so that the camera apparatus takes a picture. In an embodiment of the present invention, the foregoing first trigger status refers to the trigger status when the switch is switched from open circuit status to on status, and the second trigger status refers to the trigger status when the switch is switching from on status to open circuit status.

In overview, the present invention further provides a camera apparatus, which includes a lens module, an image detecting module, a shutter, a signal processing module, and the foregoing shutter control apparatus. The foregoing signal processing module is coupled to the image detecting module for processing the output signal of the image detecting module. The shutter is disposed between the lens module and the image detecting module. The foregoing shutter control apparatus has a switch which has a first trigger status and a second trigger status.

While the switch produces the first trigger status, the camera apparatus automatically focuses. While the switch produces the first trigger status and the second trigger status sequentially, if the timing between the adjacent first trigger status and second trigger status locates between an upper limit and a lower limit, the shutter control apparatus turns on/off the shutter of the camera apparatus, and the image detecting module detects an image through the lens module and outputs a signal to the signal processing module so that the camera apparatus takes a picture. In another embodiment of the present invention, the foregoing first trigger status refers to the trigger status when the switch is switching from open circuit status to on status, and the second trigger status refers to the trigger status when the switch is switching from on status to open circuit status.

In another embodiment of the present invention, the camera apparatus may also automatically focus while the switch produces the first trigger status. Next, while the switch produces the second trigger status, the camera apparatus turns on/off the shutter so that the image detecting module detects an image through the lens module.

According to another embodiment of the present invention, the foregoing first trigger status refers to the trigger status when the switch is switching from open circuit status to on status, and the second trigger status refers to the trigger status when the switch is switching from on status to open circuit status.

According to the present invention, the shutter is controlled through timing method, and the shutter of a camera apparatus is controlled according to the timing between two trigger statuses (from on status to open circuit status and from open circuit status to on status) of a single switch, thus the function of the conventional dual switches control can be achieved. Accordingly, the present invention can be applied to small volume digital cameras or used for controlling the shutter of a mobile communication device which has the function of digital camera. With the technology of the present invention, the space efficiency of the mobile communication device can be increased and the component cost thereof can be reduced.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
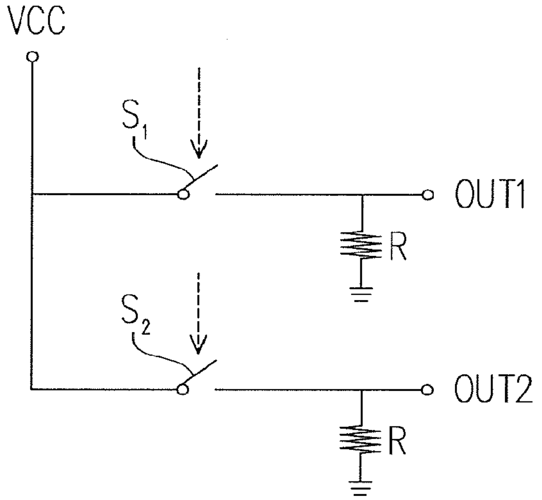
FIG. 1 is a diagram of a conventional shutter control circuit.
Figure 2:
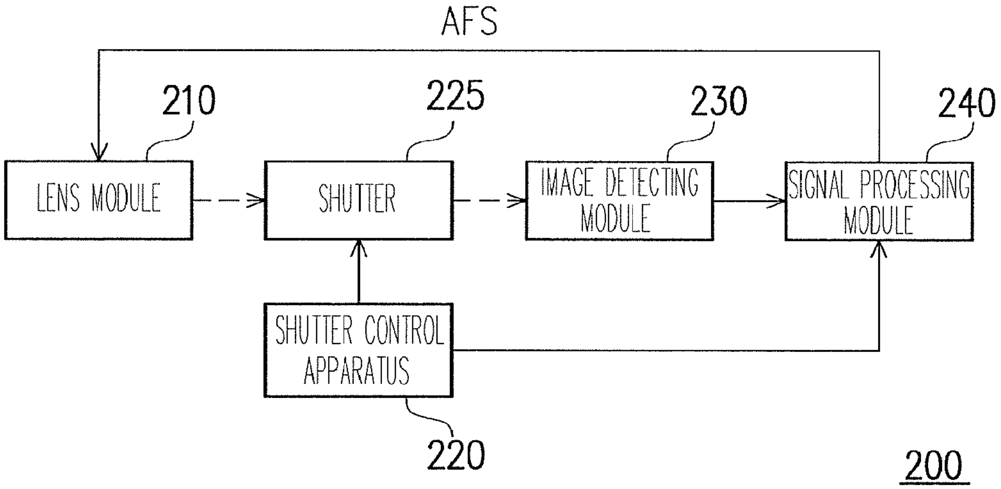
FIG. 2 is a schematic block diagram of a camera apparatus according to an embodiment of the present invention.

FIG. 2 is a schematic block diagram of a camera apparatus according to an embodiment of the present invention. The camera apparatus 200 includes a lens module 210, a shutter control apparatus 220, a shutter 225, an image detecting module 230, and a signal processing module 240. The shutter 225 is disposed between the lens module 210 and the image detecting module 230, and the shutter control apparatus 220 is coupled to the shutter 225 for turning on/off the shutter 225. The signal processing module 240 is coupled to the image detecting module 230 for processing the output of the image detecting module 230, and the image detecting module 230 detects an image through the lens module 210 while the shutter 225 is turned on and outputs a signal to the signal processing module 240.

Since the shutter 225 is only turned on for a short while when the camera apparatus 200 is taking picture, the shutter control apparatus 220 has to turns on and off the shutter 225 within a short time, that is, the operation of turning on/off the shutter 225 has to be completed within a short time, so that the camera apparatus 200 can take a picture within a short time.

In the present embodiment, the shutter control apparatus 220 turns on/off the shutter 225 mainly according to the timing between the first trigger status and the second trigger status of a switch. In the present embodiment, the first trigger status refers to the trigger status when the switch is switching from open circuit status to on status, and the second trigger status refers to the trigger status when the switch is switching from on status to open circuit status. After the switch produces the first trigger status, the signal processing module 240 outputs an auto focus signal AFS to the lens module 210, so that the lens module 210 automatically focuses between the camera apparatus 200 and the object to be taken picture of.

Next, when the switch produces the second trigger status, the shutter control apparatus 220 estimates the timing between the first trigger status and the second trigger status of the switch and sets the timing as detection timing. If the detection timing is between an upper limit and a lower limit, the shutter control apparatus 220 turns on/off the shutter 225, so that the image detecting module 230 detects an image through the lens module 210, and the camera apparatus 200 takes a picture through the detect of the image detecting module 230. If the detection timing is greater than the upper limit or smaller than the lower limit, the shutter control apparatus 220 controls the camera apparatus 200 to cancel the picture-taking operation.

The foregoing upper limit and lower limit can be set according to system requirement and user requirement, wherein the upper limit is greater than the lower limit, and the upper limit and the lower limit are both positive. In the present invention, whether the detection timing between the first trigger status and the second trigger status is smaller than the upper limit can be detected and the relation thereof with the lower limit can be ignored according to system requirement and user requirement. In another embodiment of the present invention, the first trigger status refers to the trigger status when the switch is switching from on status to open circuit status, and the second trigger status refers to the trigger status when the switch is switching from open circuit status to on status. Similarly, the shutter of the camera apparatus can be controlled according to the timing between the first trigger status and the second trigger status. Those with ordinary skill in the art should be able to understand from the present disclosure, so will not be described again.

Figure 3:
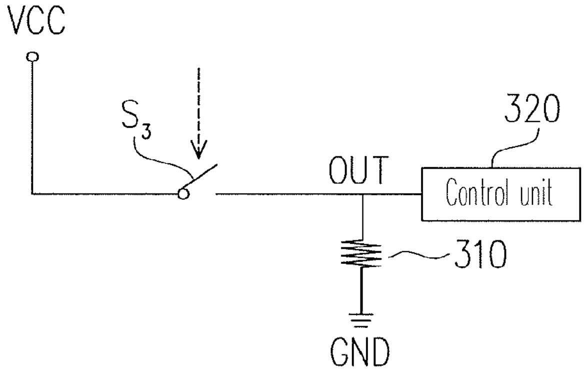
FIG. 3 is a circuit diagram of the shutter control apparatus in the present embodiment.

The main component of the foregoing shutter control apparatus 220 is a switch. FIG. 3 is a circuit diagram of the shutter control apparatus in the present embodiment. The shutter control apparatus 220 includes a voltage source VCC, a switch $S_3$, a resistor 310, a control unit 320 and an output terminal OUT. The switch $S_3$ is coupled between the voltage source VCC and the output terminal OUT, and the resistor 310 is coupled between the output terminal OUT and a ground voltage source GND. The control unit 320 is coupled to the output terminal OUT and used for detecting a trigger status change of the switch according to an output voltage at the output terminal. While the switch $S_3$ is turned on, the output terminal OUT is at high voltage level, and while the switch $S_3$ is in open circuit status, the output terminal OUT is at low voltage level. The control unit 320 of the shutter control apparatus 220 can estimate the timing, i.e. detection timing, between the first trigger status and the second trigger status of the switch $S_3$ according to the change of the voltage level at the output terminal OUT.

While the switch $S_3$ produces the first trigger status, the camera apparatus 200 automatically focuses. Next, while the switch $S_3$ produces the second trigger status, the shutter control apparatus 220 determines whether to turn on/off the shutter 225 according to timing between the first trigger status and the second trigger status of the switch $S_3$, that is, determines whether to turn on/off the shutter 225 according to the detection timing. If the detection timing is between an upper limit and a lower limit, the shutter control apparatus 220 turns on/off the shutter 225 of the camera apparatus 200, so that the camera apparatus 200 takes a picture. If the detection timing is greater than the upper limit or smaller than the lower limit, the camera apparatus 200 cancels the picture-taking operation. The detection timing can be estimated from the change of the voltage level at the output terminal OUT.

In the present embodiment, the switch $S_3$ can be turned on/off by a button, the switch $S_3$ is switched from open circuit status to on status (i.e. producing the first trigger status) while the button is pressed, and the switch $S_3$ is switched from on status to open circuit status (i.e. producing the second trigger status) while the button is released. Thus, when the user presses the button, the camera apparatus 200 starts focusing automatically. Then, when the user releases the button, the shutter control apparatus 220 estimates the timing of the user pressing the button. If the timing is between the upper limit and the lower limit, the shutter control apparatus 220 turns on/off the shutter 225, so that the camera apparatus 230 can detect an image through the lens module 210. The image detecting module 230 transmits the converted signal to the image processing module 240 for processing the signal, so that the camera apparatus 200 takes a picture. If the timing of the user pressing the button is smaller than the lower limit or greater than the upper limit, the camera apparatus 200 cancels the picture-taking operation.

The foregoing lower limit and upper limit can be set by the user. The lower limit is for preventing the user from mistakenly pressing the button, and the upper limit can be set according to the auto focus time of the camera apparatus 200 and the user's habit. Both the lower limit and the upper limit can be set according to user requirement, but the upper limit has to be greater than the lower limit and both are positive. Certainly, in the present invention, only the relation of the timing between the first trigger status and the second trigger status and the upper limit can be detected according to system requirement and user requirement, and the relation with the lower limit can be ignored. The technology details should be understood by those with ordinary skill in the art so will not be described again.

Figure 4:
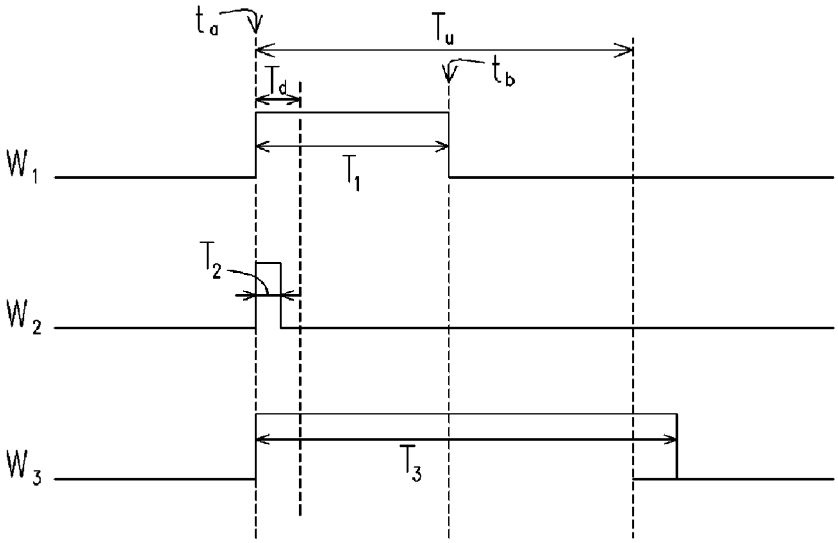
FIG. 4 is a signal waveform of the shutter control apparatus in the present invention.

Next, the main waveform signal in the shutter control apparatus 220 will be further described below. FIG. 4 is a signal waveform of the shutter control apparatus in the present invention. Signals $W_1$, $W_2$, and $W_3$ are the signal waveforms of the output terminal OUT. Signal $W_1$ is the signal waveform under normal operation, switch $S_3$ produces the first trigger status (from open circuit status to on status) at time $t_a$, and produces the second trigger status (from on status to open circuit status) after timing $T_1$, i.e. at time $t_b$.

The switch $S_3$ is turned on during detection timing $T_1$, thus, signal $W_1$ is at high voltage level during the detection timing $T_1$. The timing between the first trigger status and the second trigger status of the switch $S_3$ (i.e. the detection timing $T_1$) can be estimated according to the voltage level change of the signal $W_1$. As illustrated by signal $W_1$, the signal processing module 240 output an auto focus signal AFS to the lens module 210 after time $t_a$ to automatically focus between the camera apparatus 200 and the object to be taken picture of. Since the detection timing $T_1$ is between the lower limit $T_d$ and the upper limit $T_u$, the shutter control apparatus 220 turns on/off the shutter 225 after time $t_b$, so that the camera apparatus 200 detects an image and takes a picture.

Signal $W_2$ is the signal waveform when the detection timing $T_2$ is smaller than the lower limit $T_d$. As illustrated by signal $W_2$, switch $S_3$ is turned on during the detection timing $T_2$. Since the detection timing $T_2$ is smaller than the lower limit $T_d$, the camera apparatus 200 cancels the picture-taking operation after the detection timing $T_2$ has passed. Signal $W_3$ is the signal waveform when the detection timing $T_3$ is greater than the upper limit $T_u$. As illustrated by signal $W_3$, switch $S_3$ is turned on during the detection timing $T_3$. Since the detection timing $T_3$ is greater than the upper limit $T_u$, the camera apparatus 200 cancels the picture-taking operation after the detection timing $T_3$ has passed.

In the present embodiment, the technology of the present invention is explained with the timing of the switch $S_3$ being turned on as example. In another embodiment of the present invention, the timing of the switch $S_3$ at open circuit status can also be used to implement the present invention, and the timing of the switch $S_3$ at open circuit status can also be estimated according to the voltage level change of the output terminal OUT, and the shutter 225 of the camera apparatus 200 is turned on/off according to this timing. The implementation method thereof should be understood by those with ordinary skill in the art, so will not be described here. In addition, whether the timing between the first trigger status and the second trigger status is smaller than the upper limit $T_u$ can be detected according to system requirement and user requirement, and the lower limit $T_d$ is ignored. In this case, the signal $W_1$ and signal $W_2$ as shown in FIG. 4 both take pictures. The various methods for controlling the focus and the shutter with two trigger statuses of a single switch are all within the spirit and scope of the present invention and should be understood by those with ordinary skill in the art, so will not be described again.

In another embodiment of the present invention, referring to both FIG. 2 and FIG. 3, the auto focusing operation and the turning on/off operation of the camera apparatus 200 can be respectively controlled with two trigger statuses of the switch $S_3$ (the first trigger status and the second trigger status). When the switch $S_3$ produces the first trigger status, the camera apparatus 200 automatically focuses, then, when the switch $S_3$ produces the second trigger status, the shutter control apparatus 220 turns on/off the shutter 225 so that the camera apparatus 200 takes a picture. The rest details of the present embodiment should be understood by those with ordinary skill in the art from the present disclosure so will not be described again.

Figure 5:
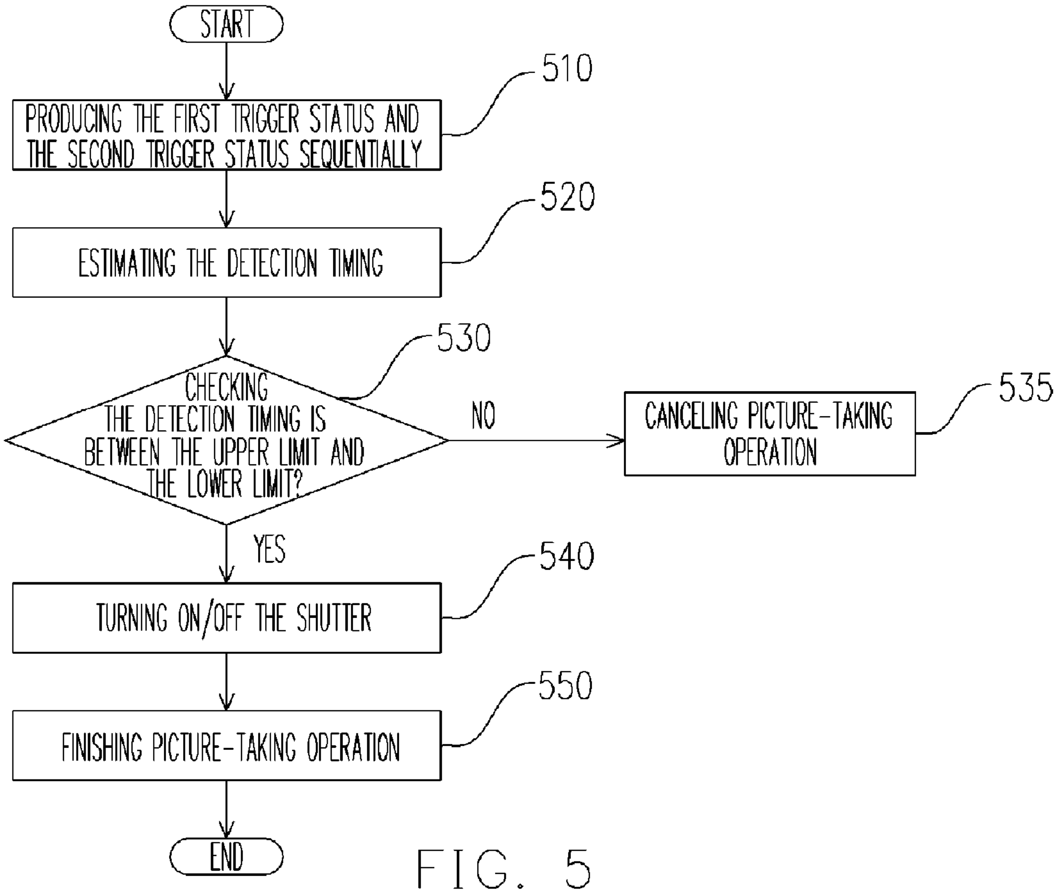
FIG. 5 is a flowchart illustrating the shutter control method according to another embodiment of the present invention.

FIG. 5 is a flowchart illustrating the shutter control method according to another embodiment of the present invention. The shutter control method is suitable for controlling the shutter 225 of the camera apparatus 200. The camera apparatus 200 has a switch $S_3$, and the switch $S_3$ has a first trigger status and a second trigger status. The shutter control method includes the following steps. First, in step 510, the first trigger status and the second trigger status are sequentially produced. In the present embodiment, the switch $S_3$ produces the first trigger status (switching the switch from open circuit status to on status). Here, the camera apparatus 200 automatically focuses through the signal processing module 240 and the lens module 210. The switch $S_3$ produces the second trigger status (switching the switch from on status to open circuit status) after a detection timing. Next, in step 520, the timing between the foregoing first trigger status and second trigger status, i.e. the detection timing, is estimated.

After that, in step 530, the condition expression is executed. If the detection timing is greater than the upper limit or smaller than the lower limit, step 535 is proceeded to cancel the picture-taking operation. If the detection timing is between the upper limit and the lower limit, step 540 is preceded. In step 540, the shutter control apparatus 220 turns on/off the shutter 225, so that the image detecting module 230 detects an image through the lens module 210. Next, in step 550, the image detecting module 230 outputs a signal according to the detected image to the signal processing module 240 to be processed, so that the camera apparatus 200 takes a picture. In the shutter control method of the present embodiment, the rest details has been described in the foregoing description of the shutter control apparatus and can be understood by those skilled in the art, so will not be described again.

Figure 6:
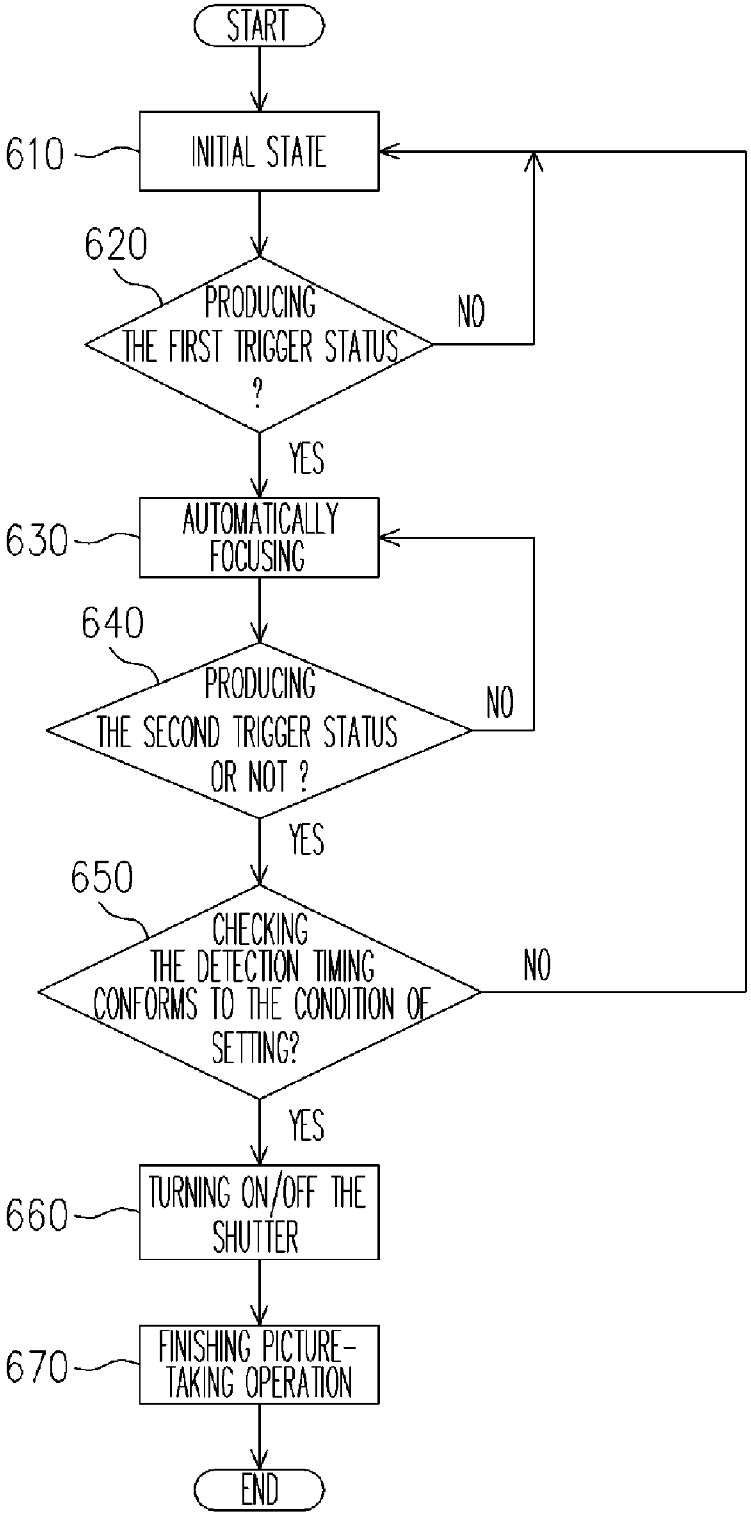
FIG. 6 is a flowchart illustrating the shutter control method according to another embodiment of the present invention.

FIG. 6 is a flowchart illustrating the shutter control method according to another embodiment of the present invention. First, in step 610, the camera apparatus 200 is initialized. Then, in step 620, the condition expression is executed, and the shutter control apparatus 220 determines whether the switch $S_3$ produces a first trigger status (switching the switch from open circuit status to on status), if no, the procedure goes back to step 610. If the switch $S_3$ produces the first trigger status, the next step is preceded. In step 630, the camera apparatus 200 automatically focuses through the signal processing module 240 and the lens module 210. Next, in step 640, the condition expression is proceeded, and the shutter control apparatus 220 determines whether the switch $S_3$ produces the second trigger status, if no, the procedure goes back to step 630, and the camera apparatus 200 continues to take a picture. If the switch $S_3$ produces the second trigger status, step 650 is preceded.

In step 650, the shutter control apparatus 220 determines whether the detection timing meets a predetermined condition, wherein the detection timing is the timing between the foregoing first trigger status and second trigger status. In the present embodiment, the predetermined condition includes an upper limit and a lower limit. The detection timing meets the predetermined condition if the detection timing is between the upper limit and the lower limit, otherwise the detection timing doesn't meet the predetermined condition. In another embodiment of the present invention, different predetermined conditions can be set according to user requirement or system requirement. For example, an upper limit, the detection timing meets the predetermined condition if the detection timing is smaller than the upper limit, and it doesn't meet the predetermined condition if it is greater than the upper limit. The foregoing upper limit and lower limit can be set according to user requirement or system requirement.

Next, if the detection timing meets the predetermined condition, step 660 is proceeded. In step 660, the shutter control apparatus 220 turns on/off the shutter 225, so that the image detecting module 230 detects an image through the lens module 210. Next, in step 670, the image detecting module 230 outputs a signal according to the detected image to the signal processing module 240 to be processed, so that the camera apparatus 200 takes a picture. In the shutter control method in the present embodiment, the rest details are explained in the description of the foregoing shutter control apparatus, and it should be understood by those skilled in the art, so will not be described again.

In the present invention, the shutter of the camera apparatus is turned on/off according to two trigger statuses (from open circuit status to on status and from on status to open circuit status) of a single switch through timing method, so as to simplify the circuit design and components number, which reduces the space required by the circuit and the manufacturing cost of the circuit. Meanwhile, the present invention is more suitable for mobile communication devices.

In addition, a shutter control method is further disclosed in another exemplary embodiment of the present invention, wherein the step of detecting the timing between the two trigger statuses of the single switch can be skipped, instead, auto focusing and turning on/off the shutter can be performed through detecting the trigger statuses sequence of the signal switch. According to this control method, when the switch produces the first trigger status, the lens module automatically focuses, and if next the switch produces the second trigger status, the shutter control apparatus turns on/off the shutter, so that the image detecting module detects an image through the lens module. According to this embodiment, the timing between the two trigger statuses is not detected, so there is no upper limit or lower limit set.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A shutter control apparatus, suitable for controlling the shutter of a camera apparatus, the shutter control apparatus comprising:

a resistor, coupled between an output terminal and a ground voltage source;

a switch, coupled between a voltage source and the output terminal; and a control unit, coupled to the output terminal, for detecting a trigger status change of the switch according to an output voltage at the output terminal, wherein, the switch has a first trigger status and a second trigger status, while the switch produces the first trigger status and the second trigger status sequentially, if the timing, detected by the control unit, between the adjacent first trigger status and second trigger status is between an upper limit and a lower limit, the shutter control apparatus turns on/off the shutter of the camera apparatus so that the camera apparatus takes a picture.

2. The shutter control apparatus as claimed in claim 1, wherein if the timing between the adjacent first trigger status and second trigger status is smaller than the lower limit, the shutter control apparatus controls the camera apparatus to cancel the picture-taking operation.

3. The shutter control apparatus as claimed in claim 1, wherein if the timing between the adjacent first trigger status and second trigger status is greater than the upper limit, the shutter control apparatus controls the camera apparatus to cancel the picture-taking operation.

4. The shutter control apparatus as claimed in claim 1, wherein the shutter control apparatus further comprises a button for triggering the switch, the switch produces the first trigger status while the button is pressed, and the switch produces the second trigger status while the button is released.

5. The shutter control apparatus as claimed in claim 1, wherein the first trigger status refers to the trigger status when the switch is switching from on status to open circuit status, and the second trigger status refers to the trigger status when the switch is switching from open circuit status to on status.

6. The shutter control apparatus as claimed in claim 1, wherein the first trigger status refers to the trigger status when the switch is switching from open circuit status to on status, and the second trigger status refers to the trigger status when the switch is switching from on status to open circuit status.

7. The shutter control apparatus as claimed in claim 1, wherein the upper limit is greater than the lower limit, and the upper limit and the lower limit are both positive.

8. A shutter control apparatus, suitable for controlling the shutter of a camera apparatus, the shutter control apparatus comprising:

a resistor, coupled between an output terminal and a ground voltage source;

a switch, coupled between a voltage source and the output terminal;

a control unit, coupled to the output terminal, for detecting a trigger status change of the switch according to an output voltage at the output terminal; and a button, for triggering the switch, wherein, the switch has a first trigger status and a second trigger status, the switch produces the first trigger status while the button is pressed, and the switch produces the second trigger status while the button is released, while the switch produces the first trigger status and the second trigger status sequentially, if the timing, detected by the control unit, between the adjacent first trigger status and second trigger status is smaller than an upper limit, the shutter control apparatus turns on/off the shutter of the camera apparatus so that the camera apparatus takes a picture.

9. The shutter control apparatus as claimed in claim 8, wherein if the timing between the adjacent first trigger status and second trigger status is greater than the upper limit, the shutter control apparatus controls the camera apparatus to cancel the picture-taking operation.

10. The shutter control apparatus as claimed in claim 8, wherein the first trigger status refers to the trigger status when the switch is switching from on status to open circuit status, and the second trigger status refers to the trigger status when the switch is switching from open circuit status to on status.

11. The shutter control apparatus as claimed in claim 8, wherein the first trigger status refers to the trigger status when the switch is switching from open circuit status to on status, and the second trigger status refers to the trigger status when the switch is switching from on status to open circuit status.

12. A shutter control method, suitable for controlling the shutter of a camera apparatus, the camera apparatus having a switch, and the switch having a first trigger status and a second trigger status, the shutter control method comprising the following steps:

producing the first trigger status and the second trigger status sequentially;

while producing the second trigger status, estimating the timing between the first trigger status and the second trigger status; and if the timing between the first trigger status and the second trigger status being between an upper limit and a lower limit, turning on/off the shutter of the camera apparatus, so that the camera apparatus takes a picture.

13. The shutter control method as claimed in claim 12, wherein the step of producing the first trigger status and the second trigger status further comprises automatically focusing between the camera apparatus and the object to be taken picture of after producing the first trigger status.

14. The shutter control method as claimed in claim 12, wherein if the timing between the first trigger status and the second trigger status is between the upper limit and the lower limit, the shutter of the camera apparatus is turned on/off, and the picture-taking step of the camera apparatus further comprises that if the timing between the first trigger status and the second trigger status is smaller than the lower limit, the camera apparatus cancels the picture-taking operation.

15. The shutter control method as claimed in claim 12, wherein if the timing between the first trigger status and the second trigger status is between the upper limit and the lower limit, the shutter of the camera apparatus is turned on/off, and the picture-taking step of the camera apparatus further comprises if the timing between the first trigger status and the second trigger status is greater than the upper limit, the camera apparatus cancels the picture-taking operation.

16. The shutter control method as claimed in claim 12, wherein the step of sequentially producing the first trigger status and the second trigger status further comprises triggering the switch with a button, the switch producing the first trigger status while the button being pressed, and the switch producing the second trigger status while the button being released.

17. The shutter control method as claimed in claim 12, wherein the first trigger status refers to the trigger status when the switch is switching from on status to open circuit status, and the second trigger status refers to the trigger status when the switch is switching from open circuit status to on status.

18. The shutter control method as claimed in claim 12, wherein the first trigger status refers to the trigger status when the switch is switching from open circuit status to on status, and the second trigger status refers to the trigger status when the switch is switching from on status to open circuit status.

19. The shutter control method as claimed in claim 12, wherein the upper limit is greater than the lower limit, and the upper limit and the lower limit are both positive.

20. A shutter control method, suitable for controlling the shutter of a camera apparatus, the camera apparatus having a switch, and the switch having a first trigger status and a second trigger status, the shutter control method comprising the following steps:

sequentially producing the first trigger status and the second trigger status, wherein the switch is triggered with a button, the switch produces the first trigger status while the button is pressed, and the switch produces the second trigger status while the button is released;

while producing the second trigger status, estimating the timing between the first trigger status and the second trigger status; and if the timing between the first trigger status and the second trigger status being smaller than an upper limit, turning on/off the shutter of the camera apparatus, so that the camera apparatus takes a picture.

21. The shutter control method as claimed in claim 20, wherein the step of sequentially producing the first trigger status and the second trigger status further comprises automatically focusing between the camera apparatus and the object to be taken picture of after producing the first trigger status.

22. The shutter control method as claimed in claim 20, wherein if the timing between the first trigger status and the second trigger status is smaller than an upper limit, the shutter of the camera apparatus is turned on/off, and the picture-taking step of the camera apparatus further comprises that if the timing between the first trigger status and the second trigger status is greater than the upper limit, the camera apparatus cancels the picture-taking operation.

23. The shutter control method as claimed in claim 20, wherein the first trigger status refers to the trigger status when the switch is switching from on status to open circuit status, and the second trigger status refers to the trigger status when the switch is switching from open circuit status to on status.

24. The shutter control method as claimed in claim 20, wherein the first trigger status refers to the trigger status when the switch is switching from open circuit status to on status, and the second trigger status refers to the trigger status when the switch is switching from on status to open circuit status.

25. A camera apparatus, comprising:

a lens module;

an image detecting module, coupled to a signal processing module;

a shutter, disposed between the lens module and the image detecting module; and a shutter control apparatus, coupled to the shutter for turning on/off the shutter;

wherein, the shutter control apparatus has a switch and a control unit, the switch has a first trigger status and a second trigger status, while the switch sequentially produces the first trigger status and the second trigger status, if the timing, detected by the control unit, between the adjacent first trigger status and second trigger status is between an upper limit and a lower limit, the shutter control apparatus turns on/off the shutter, and the image detecting module detects an image through the lens module and outputs a signal to the signal processing module, so that the camera apparatus takes a picture.

26. The camera apparatus as claimed in claim 25, wherein the shutter control apparatus further comprises:

a resistor, coupled between an output terminal and a ground voltage source, the switch being coupled between a voltage source and the output terminal, wherein the control unit is coupled the output terminal and used for detecting a trigger status change of the switch according to an output voltage at the output terminal.

27. The camera apparatus as claimed in claim 25, wherein if the timing between the adjacent first trigger status and second trigger status is smaller than the lower limit, the shutter control apparatus controls the camera apparatus to cancel the picture-taking operation.

28. The camera apparatus as claimed in claim 25, wherein if the timing between the adjacent first trigger status and second trigger status is greater than the upper limit, the shutter control apparatus controls the camera apparatus to cancel the picture-taking operation.

29. The camera apparatus as claimed in claim 25, wherein the shutter control apparatus further comprises triggering the switch with a button, the switch produces the first trigger status while the button is pressed, and the switch produces the second trigger status while the button is released.

30. The camera apparatus as claimed in claim 25, wherein the first trigger status refers to the trigger status when the switch is switching from on status to open circuit status, and the second trigger status refers to the trigger status when the switch is switching from open circuit status to on status.

31. The camera apparatus as claimed in claim 25, wherein the first trigger status refers to the trigger status when the switch is switching from open circuit status to on status, and the second trigger status refers to the trigger status when the switch is switching from on status to open circuit status.

32. The camera apparatus as claimed in claim 25, wherein the upper limit is greater than the lower limit, and the upper limit and the lower limit are both positive.

33. The camera apparatus as claimed in claim 25, wherein when the switch produces the first trigger status, the signal processing module outputs an auto focus signal to the lens module so as to automatically focus between the camera apparatus and the object to be taken picture of.

34. A camera apparatus, comprising:

a lens module;

an image detecting module, coupled to a signal processing module;

a shutter, disposed between the lens module and the image detecting module; and a shutter control apparatus, coupled to the shutter for turning on/off the shutter;

wherein, the shutter control apparatus has a switch and a control unit and triggers the switch with a button, and the switch has a first trigger status and a second trigger status, wherein the switch produces the first trigger status while the button is pressed, and the switch produces the second trigger status while the button is released, while the switch sequentially produces the first trigger status and the second trigger status, if the timing, detected by the control unit, between the adjacent first trigger status and second trigger status is smaller than an upper limit, the shutter control apparatus turns on/off the shutter, and the image detecting module detects an image through the lens module and outputs a signal to the signal processing module, so that the camera apparatus takes a picture.

35. The camera apparatus as claimed in claim 34, wherein the shutter control apparatus further comprises:

a resistor, coupled between an output terminal and a ground voltage source, the switch being coupled between a voltage source and the output terminal, wherein the control unit is coupled the output terminal and used for detecting a trigger status change of the switch according to an output voltage at the output terminal.

36. The camera apparatus as claimed in claim 34, wherein if the timing between the adjacent first trigger status and second trigger status is greater than the upper limit, the shutter control apparatus controls the camera apparatus to cancel the picture-taking operation.

37. The camera apparatus as claimed in claim 34, wherein the first trigger status refers to the trigger status when the switch is switching from on status to open circuit status, and the second trigger status refers to the trigger status when the switch is switching from open circuit status to on status.

38. The camera apparatus as claimed in claim 34, wherein the first trigger status refers to the trigger status when the switch is switching from open circuit status to on status, and the second trigger status refers to the trigger status when the switch is switching from on status to open circuit status.

39. The camera apparatus as claimed in claim 34, wherein while the switch produces the first trigger status, the signal processing module outputs an auto focus signal to the lens module to automatically focus between the camera apparatus and the object to be taken picture of.

* * * * *